United States Patent
Cheong

[11] Patent Number: 6,005,609
[45] Date of Patent: Dec. 21, 1999

[54] METHOD AND APPARATUS FOR DIGITAL CORRELATION OBJECT TRACKER USING A SHAPE EXTRACTION FOCALIZATION TECHNIQUE

[75] Inventor: Seong-Hak Cheong, Seoul, Rep. of Korea

[73] Assignee: Daewoo Electronics Co., Ltd., Seoul, Rep. of Korea

[21] Appl. No.: 08/970,389

[22] Filed: Nov. 14, 1997

[30] Foreign Application Priority Data

Nov. 15, 1996 [KR] Rep. of Korea ............... 96-54439
Nov. 15, 1996 [KR] Rep. of Korea ............... 96-54440

[51] Int. Cl.[6] ............................................. H40N 7/18
[52] U.S. Cl. ..................... 348/169; 348/214; 382/103
[58] Field of Search ................................ 348/169, 214, 348/137; 382/103

[56] References Cited

U.S. PATENT DOCUMENTS

| | | | |
|---|---|---|---|
| 4,133,004 | 1/1979 | Fitts | 348/169 |
| 4,227,212 | 10/1980 | Woolfson et al. | 348/170 |
| 5,031,049 | 7/1991 | Toyama et al. | |
| 5,034,986 | 7/1991 | Karmann et al. | 382/103 |
| 5,285,273 | 2/1994 | James et al. | 348/169 |

FOREIGN PATENT DOCUMENTS

| | | |
|---|---|---|
| 0 474 307 A2 | 3/1992 | European Pat. Off. . |
| 0 474 307 A3 | 3/1992 | European Pat. Off. . |
| 0 529 619 A2 | 3/1993 | European Pat. Off. . |
| 0 530 049 A1 | 3/1993 | European Pat. Off. . |

Primary Examiner—Tommy P. Chin
Assistant Examiner—John A. Voisinet
Attorney, Agent, or Firm—Pillsbury Madison & Sutro, LLP

[57] ABSTRACT

A method and an apparatus for tracking a target wherein a shape of a target is extracted from a former image which includes an initial image of the target for tracking, and then an area including the shape of the target is extracted as a correlation area. Based on the correlation area, a checking area is extracted from a current image to check for a correlation. By utilizing a correlation function, the correlation between the former image and the current image is calculated. A location change of the target is calculated to estimate a movement of the target, on the basis of the calculated correlation. Compensating the estimated movement during operation of a camera, the camera is controlled so that a gazing point of the camera can track the target. The correlation area can be acquired either by extracting a boundary pixel of the target and scanning to extract a shape of the target which serves as the correlation area, or by quad-tree dividing and merging a window including the target on the basis of a luminosity of each pixel.

13 Claims, 10 Drawing Sheets

FORMER IMAGE(n)

CURRENT IMAGE(n+1)

FIG. 2B

FORMER IMAGE(n)

CURRENT IMAGE(n+1)

| A4 (x−1, y−1) | A7 (x, y−1) | A1 (x+1, y−1) |
|---|---|---|
| A5 (x−1, y) | A0 (x, y) | A2 (x+1, y) |
| A6 (x−1, y+1) | A8 (x, y+1) | A3 (x+1, y+1) |

FIG. 4

CORRELATION AREA

FORMER IMAGE(n)

CURRENT(n+1)

FIG. 12

METHOD AND APPARATUS FOR DIGITAL CORRELATION OBJECT TRACKER USING A SHAPE EXTRACTION FOCALIZATION TECHNIQUE

BACKGROUND OF THE INVENTION

1. Field of the Invention

The present invention relates to target tracking and apparatus, and particularly to a method and apparatus for controlling a picture-taking device to track a moving object by utilizing a calculation of a correlation between a correlation area extracted from a former image and a checking area extracted from a current area.

2. Description of the Prior Art

A target tracking technique is applied to various fields: for example, a military missile, an aircraft, and a video conference system or a video phone. Generally, a tracking method to track a target include a center point tracking method and a correlation tracking method.

Figure 2A:
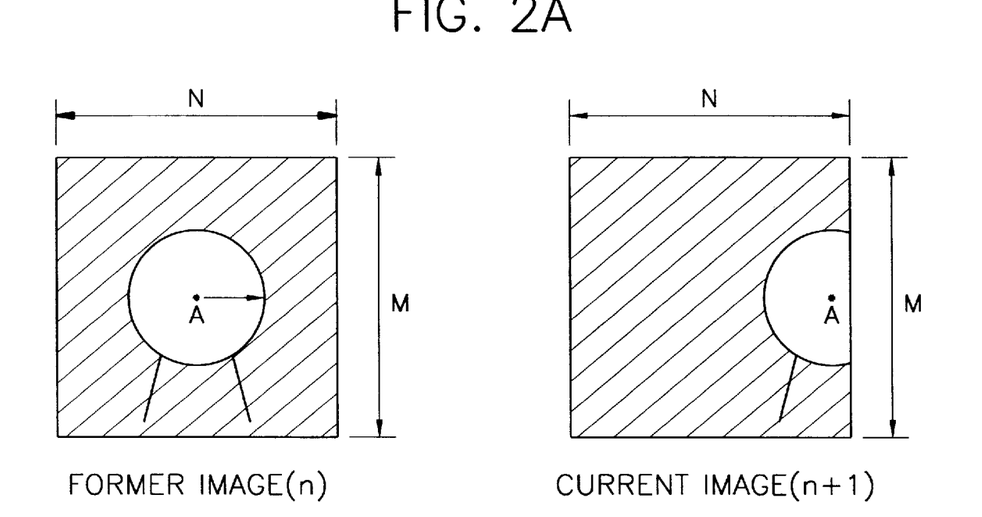
FIG. 2a is a view to illustrate a center point tracking method.

The center point tracking method is, as shown in FIG. 2a, a method where a moving object is separated from a background and then a center point of the extracted object serves as a reference in tracking. In this method, in order to separate the object from a background by utilizing a threshold, the background and the object are digitized. The method has good tracking stability and is little influenced by noises when an image is simple so as to easily be partitioned and the method is relatively little restricted by the velocity of a target, but when the condition is contrary to these conditions, it has bad tracking stability and is much influenced by noises.

Figure 2B:
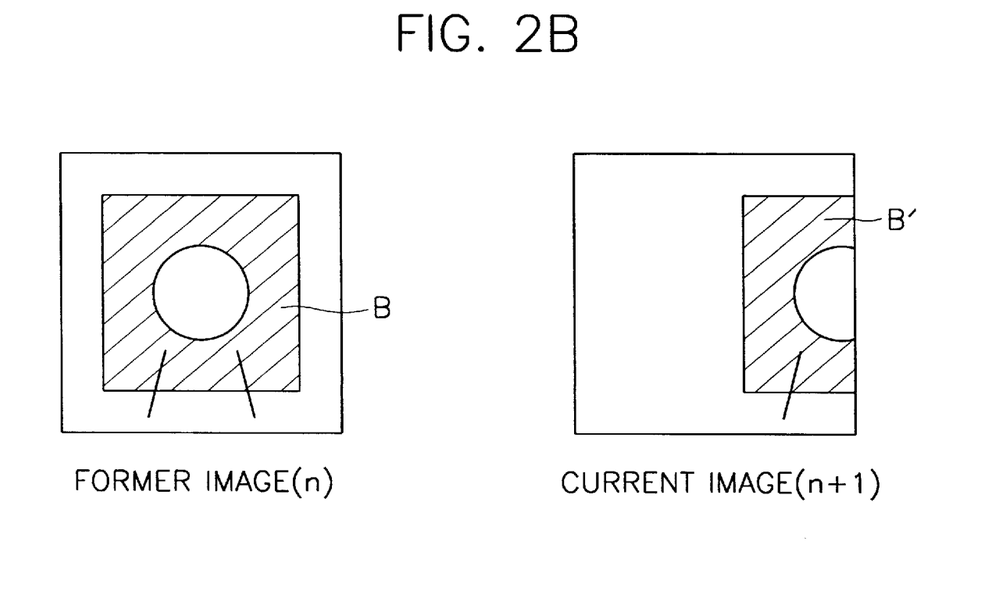
FIG. 2b is a view to illustrate a correlation tracking method.

The correlation tracking method is, as shown in FIG. 2b, a method that defines a proper size of a correlation area B in a former image on the basis of a location of a target or a moving object, and then calculates the correlation between the correlation area B and a checking area in a current image to estimate a movement of the object into an area B' whose correlation is highest. Without digitizing an image, the correlation tracking method gives good tracking stability even in a tracking of a relatively complex image because it performs a direct calculation of correlation by utilizing luminosity information of a currently input image. However, the method has such defects that it has large data to be calculated because the correlation calculation between the correlation area and the checking area should be performed throughout both areas.

SUMMARY OF THE INVENTION

The present invention is invented to solve the problem of the prior art. An object of the present invention is to provide a method and an apparatus for tracking a target where a correlation area is extracted by detecting a shape of the target and a checking area is determined in a current by utilizing the extracted correlation area, and then calculation of correlation between the correlation area and the checking area is performed to track the target, so the data to be calculated can be reduced and tracking performance can be improved.

Accordingly, to achieve the object, a method for tracking a target is provided, comprising the steps of: i) finding a shape of the target from a former image including an initial image of the target, and extracting a predetermined size of area including the shape of the target as a correlation area; ii) extracting a checking area in a current image by utilizing the correlation area to check a correlation; iii) calculating the correlation between the correlation area and the checking area by utilizing a correlation function; iv) estimating a movement of the target by calculating a change in location of the target based on the calculated correlation; and v) compensating the estimated movement during driving of a picture-taking means, thereby enabling a gazing point of the picture-taking means to track the target.

In addition, to achieve the object, an apparatus for tracking a target is provided, comprising: i) a picture-taking means for photographing a target to produce a successive image signal of the target; ii) a storing means receiving the image signal from the picture-taking means, for separately storing a current image and a former image which is supplied just before the current image; iii) a correlation area determining means receiving the former image from the storing means, for extracting a shape of the target from the former image input, and extracting a predetermined size of area including the shape as a correlation area; iv) a correlation calculating means for extracting a checking area in the current image provided from storing means on the basis of the correlation area, and calculating a correlation between the correlation area and the checking area with a correlation function; v) a movement estimating means for calculating a location change of the target to estimate movement of the target on the basis of the correlation calculated; vi) a controlling means for controlling the storing means, receiving information of the movement estimated from the movement estimating means to produce a control signal by which a gazing point of said picture-taking means can track the target; and vii) a driving means receiving the control signal from the controlling means, for driving the picture-taking means.

According to the present invention, movement of a target is estimated not by dividing the whole image into several windows and calculating the correlation of these windows according to the prior art, but by determining a correlation area after extracting of a target boundary and scanning of an extracted image, and then calculating the correlation between the correlation area and a checking area of a current image. Therefore, the present invention can reduce a quantity of data to be calculated and thereby, it can increase a tracking performance.

DETAILED DESCRIPTION OF THE PREFERRED EMBODIMENT

Hereafter, a preferred first embodiment of the present invention will be described with reference to the accompanying views. For simplicity, we will explain the target tracking in a video phone as an example.

Figure 1:
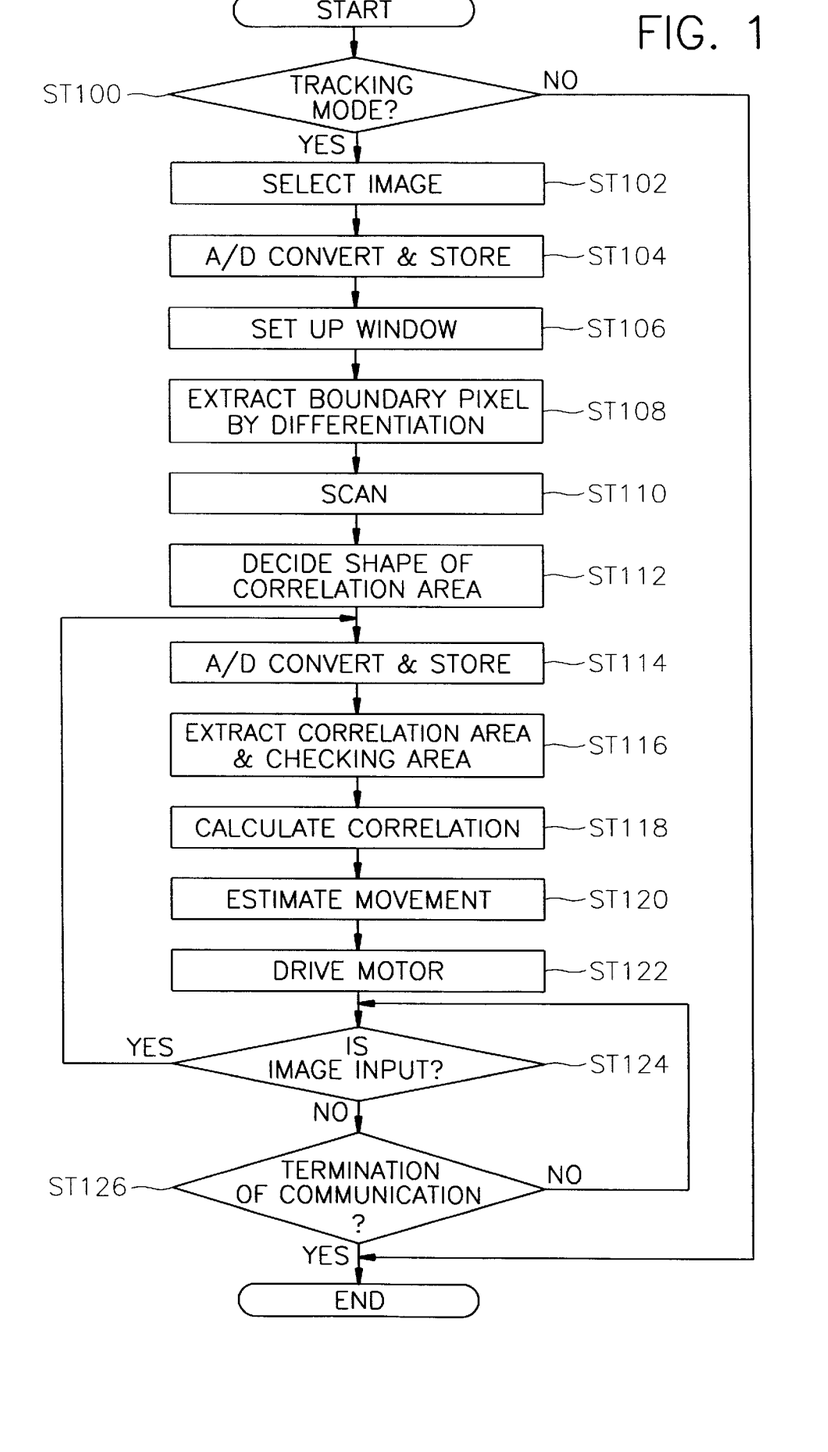
FIG. 1 is a flow chart of a first embodiment of a target tracking control method in a video phone, according to the present invention.

In FIGS. 1 to 7, a first embodiment of a method and an apparatus for tracking a target in a video phone according to the present invention is illustrated. As shown in FIG. 1, the target tracking method of the first embodiment includes the steps of: selecting an input image (ST 100, ST 102), determining a correlation area shape (ST 104 to ST 112), a step for extracting an area (ST 114, ST 116), estimating movement (ST 120) and driving a motor (ST 122). It can further include a step of terminating a communication (ST 124, ST 126).

In the step for selecting an input image (ST 100, ST 102), an image which is used in tracking is selected. In the step for determining a correlation area shape (ST 104 to ST 112), a shape of a target is extracted from an initial image to be used for determining a correlation area. In the step for extracting an area (ST 114, ST 116), a correlation area is extracted from a former image according to a determined shape of the correlation area, and a checking area is extracted from a current image for correlation check. In the step for estimating a movement (ST 120), calculation of correlation between the extracted correlation area and the checking area is carried out to estimate a movement of the target. In the step for driving a motor (ST 122), based on the estimated movement, a motor is driven and controlled so that the gazing point of a camera can be put on the target. Finally, in the step for terminating (ST 124, ST 126), the steps from the step for extracting an area to the step for driving a motor are repeatedly performed for input images until the communication comes to an end.

Figure 7:
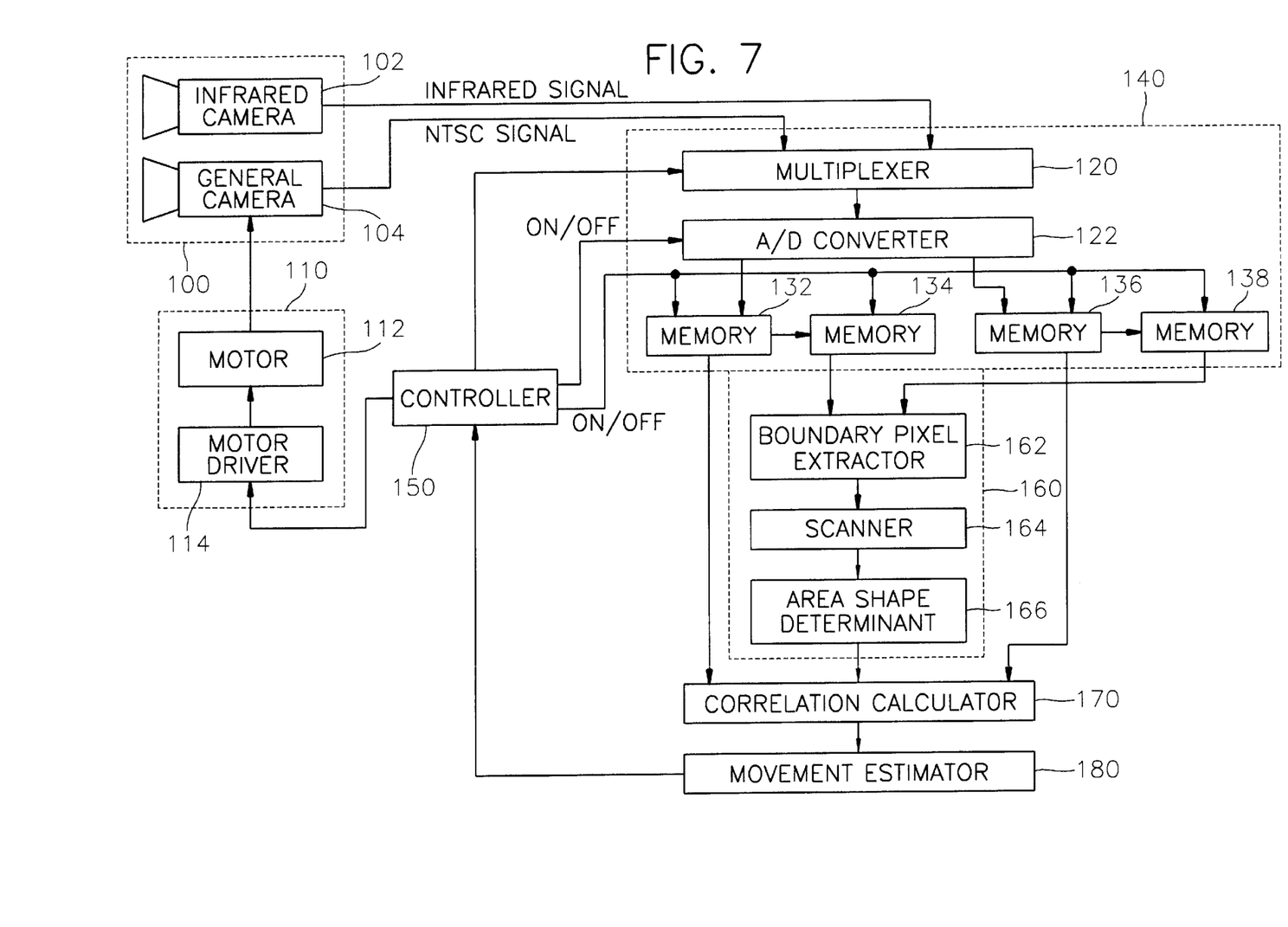
FIG. 7 is a block diagram of a first embodiment of a target tracking control apparatus in a video phone, according to the present invention.

A first embodiment of target tracking apparatus for performing the method includes, as shown in FIG. 7, a picture-taking section 100, a storing section 140, a correlation area determining section 160, a correlation calculator 170, a movement estimator 180, a controller 150 and a driving section 110.

The picture-taking section 100 includes an infrared camera 102 which takes a picture of a moving target to output an infrared image signal and a general camera 104 which takes a picture of a moving target to output as an ordinary image signal. Here, what is called the general camera section such a camera that takes luminosity information about a target and may output, for example, an NTSC signal.

The storing section 140 includes a multiplexer 120 for selecting a signal among a plurality of image signals output from the picture-taking section 100, an A/D converter 122 for converting an analog image signal output from the multiplexer 120 into a digital image signal, and a plurality of memories 132, 134, 136 and 138 for storing the converted digital signal in a state that a current image can be distinguished from a former image. The multiplexer 120 is connected to output terminals of the infrared camera 102 and the general camera 104 to receive an image signal, and is also connected to the controller 150 to be controlled for selection of an input image signal. There is no need to include the multiplexer 120 if the picture-taking section 100 outputs only one kind of image signal. The A/D converter 122 is also connected to the controller 150 to be controlled by the controller 150 for signal conversion and input/output operation. If the picture-taking section 100 originally produces an image as a digital signal, there is also no need to prepare the A/D converter 122. The first memory 132 and the third memory 136 are connected to the A/D converter 122 to store the digital signal of a current image. The second memory 134 and the fourth memory 138 are connected to the first memory 132 and the third memory 136, respectively, to store the digital signal of a former image. All of these memories 132, 134, 136 and 138 are connected to the controller 150 to be controlled for input and output operation of the data.

The correlation area determining section 160 operates to extract a shape of the target by scanning the former image signal including the initial signal, and to determine the shape of a correlation area from the shape of the target. For this, the section 160 includes a boundary pixel extracted 162, connected to the second memory 134 and the fourth memory 138, for extracting boundary pixels from an initial window containing the target of a former image to which the initial image belongs; a scanner 164, connected to the boundary pixel extractor 162, for scanning the former image horizontally and vertically along the extracted boundary pixels; and an area shape determinant 166, connected to the scanner 164, for determining a shape of correlation by utilizing the shape of the target extracted.

The initial image is an image taken by the camera when the target is positioned at a predetermined location, and the boundary pixel is extracted by comparing an absolute value of horizontal and vertical differential value of luminosity of each pixel in the predetermined initial window with a threshold value for view-out a boundary.

The correlation calculator 170 is connected to the area shape determinant 166 to receive data related to the determined correlation area. At the same time, it is connected to the first memory 132 and the third memory 136 to receive an image signal of a current image, extracts a checking area in the current image with the correlation area, and calculates the correlation between the correlation area and the checking area.

The movement estimator 180 is connected to the correlation calculator 170 to be provided with the result of correlation calculation, and based on the result, estimates the movement of the target.

The controller 150 is connected to the movement estimator 180 to receive the estimated movement, and provides the driving section 110 with a control signal to compensate the movement of the target.

The driving section 110 has a motor 112 generating a power that is necessary for changing the gazing direction of the camera 104, and has a motor driver 114 providing a driving signal to the motor 112 after receiving the control signal from the controller 150.

Hereinafter, an explanation of the apparatus will be given together with an explanation about the target tracking control method by step.

First, in the input image signal selection step (ST 100, ST 102) an image signal that is used for tracking a target in a tracking mode is selected. When a communication is initiated, considering that a user may not want to use a tracking function, whether the user tries to use the tracking function is checked (ST 100). It can be simply accomplished by a switch (not shown) to differentiate the tracking mode from a non-tracking mode.

If the tracking mode is selected by setting the tracking switch ON, an image signal from the picture-taking section 100 is selected by the multiplexer 120 after its type is checked (ST 102). The checking operation of whether the image signal used for tracking is an infrared signal from the infrared camera 102 or ordinary image signal from the general camera 104 is carried out by the controller 150. The controller 150 turns on the multiplexer 120 and controls the multiplexer 120 to select a necessary image signal between the infrared image signal and the ordinary image signal. In this embodiment, we use the output signal from the infrared camera 102 to determine the shape of the correlation area, and, on the other hand, use the output signal from the general camera 104 to calculate the correlation with the current input image. However, the present invention can adapt just the infrared camera 102.

As the picture-taking section 100 subsequently produces an image signal by frame, after selecting an image to be used for target tracking, a reference template is needed in order to track a moving target. To acquire the reference template, a shape of the target is extracted by scanning an initially input image, and then a shape of the correlation area is determined based on the shape of the target.

First of all, if the initially input image from the multiplexer 120 is an analog signal, the analog signal is converted into a digital signal and store it (ST 104). For this, the controller 150 turns the A/D convert 122 ON, and the enabled A/D convert 122 converts the analog signal into a predetermined bit, for example 8 bits of digital signal. Of course, a high bit rate of A/D converter can be adapted. The converted digital image signal I(x, y) has the size of 64 pixels by 64 pixels, and is stored in the first memory 132 and the third memory 136 as a current image. If the selected image is an infrared image signal, the selected signal is stored in the first memory 132 and the second memory 134. If the selected image is a general image signal, it is stored in the third memory 136 and the fourth memory 138. That is, the first memory 132 stores a current infrared image signal, the second memory 134 stores a former infrared image signal, the third memory 136 stores a current ordinary image signal, and the fourth memory 138 stores a former ordinary image signal. In the correlation tracking, by initial locking of a target, it is supposed that a target already knows the initial position, that is the position into which the target should move for telephoning, and the initial image can be acquired when the target is located at a predetermined position.

Figure 3A:
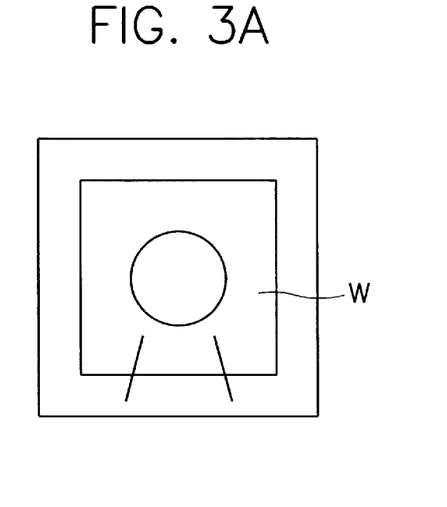
FIG. 3a is a view to illustrate a step for setting-up an initial window shown in FIG. 1.

Next, in the stored initial image, setup an initial window W including the target (ST 106). As shown in FIG. 3a, the set window W has a size, such as 8 pixel by 8 pixel, such that it can sufficiently include the face of the target while taking the center of the target as a reference.

Figure 3B:
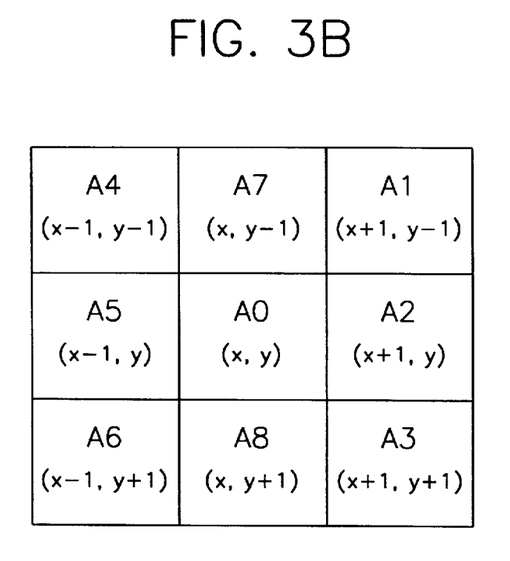
FIG. 3b is a view to illustrate a step for extracting boundary pixels shown in FIG. 1.

The boundary pixel extractor 162, such as differentiator, differentiates all the pixels within the window W to extract boundary pixels (ST 108). The fact that there exists a lot of difference in luminosity between the target and a background is used to find the boundary pixels. In FIG. 3b, an image signal corresponding each pixel within the initial window is a signal I(x, y) to which a luminosity value is assigned. The differentiation for each pixel of the window is performed according to the following equations (1) and (2) horizontally and vertically.

$$h=I(x-1, y-1)+I(x-1, y)+I(x-1, y+1)-I(x+1, y-1)-I(x+1, y)-I(x+1, y+1) \quad (1)$$

$$v=I(x-1, y-1)+I(x, y-1)+I(x+1, y-1)-I(x-1, y+1)-I(x, y+)-I(x+1, y+1) \quad (2)$$

The horizontal differentiation is performed by subtracting the luminosity values (A1, A2, A3) of the right pixels from the luminosity values (A4, A5, A6) of the left pixels, with the center pixel A0 (x, y) as a reference. Also, the vertical differentiation is performed by subtracting the luminosity values (A4, A7, A1) of the upper pixels from the luminosity values (A6, A8, A3) of the lower pixels, with the center pixel A0 (x, y) as a reference. After acquiring the horizontal and vertical differential values, h and v, the absolute value of the differential values, $|D|=(h^2+v^2)^{1/2}$ is calculated. Then, the differential value $|D|$ is compared with a predetermined threshold in order to find boundary. In the comparison, if the differential value is larger than the threshold, a corresponding reference pixel, such as A0, is selected as a boundary pixel.

Figure 4:
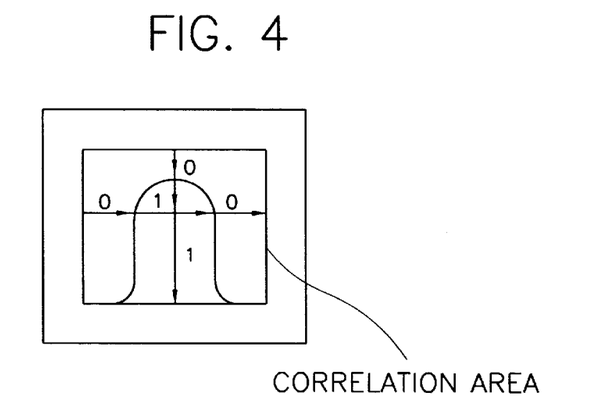
FIG. 4 is a view to illustrate a step for scanning shown in FIG. 1.

After finding all of the boundary pixels, the image of the window is horizontally and vertically scanned to find the target's shape. As shown in FIG. 4, with the scanner 164, '0' is initially assigned to all of the pixels in the window, and all of these pixels are scanned horizontally and vertically. During the scanning if a boundary pixel is encountered, the value of encountered pixel is changed to '1'. Continuously, '1' is assigned to all the pixels encountered until new boundary pixel is encountered. If a new boundary pixel is encountered, the value '0' is kept from the pixel next to the newly encountered boundary pixel. From this signal process, the pixels representing the target have the value '1', and the other pixels representing the remaining area have the value '0'. Thus, the shape of the target can be found by extracting the pixels having the value '1'.

Next, a shape of the correlation area, as shown in FIG. 4, is determined by utilizing the extracted shape of the target (ST 112). The shape of the correlation area extracted from the initial image is utilized as a reference template to extract a correlation area and a checking area that are used in correlation calculation, in the successive image signals.

Utilizing the shape of the correlation area, the step for extracting a correlation area and a checking area from the successive images following the initial image (ST 114, ST 116) is conducted.

Figure 5:
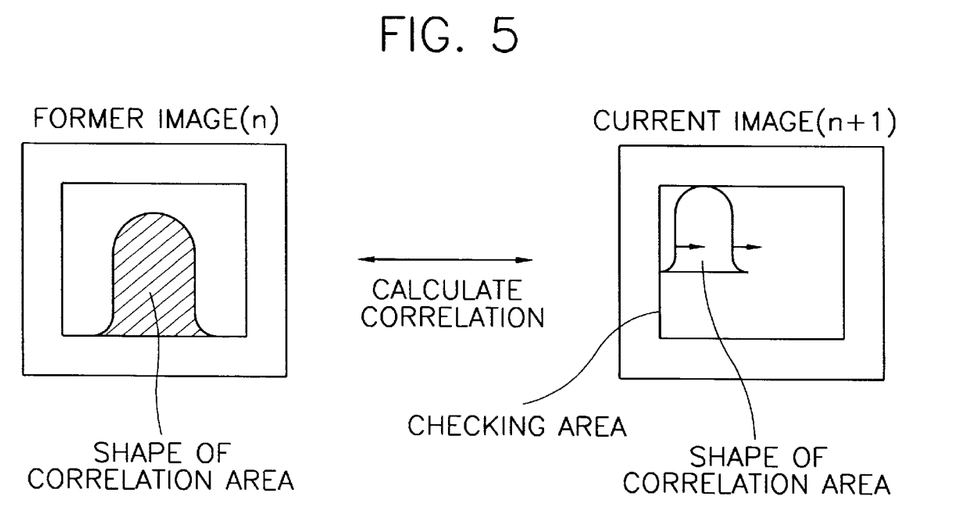
FIG. 5 is a view to illustrate a step for extracting an area shown in FIG. 1.

If the image signal from the picture-taking section 100 is an analog signal, the signal is converted into a digital signal and the digital signal is saved in the storing section 140 (ST 114). After extracting the shape of the correlation area from the initial window, as the initial image becomes a former image, the extracted correlation area as itself is set as a correlation area of the second image. The reason is that an area in a former image having a highest correlation is the extracted correlation area. After extracting the correlation area as this, a checking area is extracted that is as wide as 4 times a minimum rectangle including the extracted correlation area in the former image.

A correlation calculation between the correlation area of a former image and the checking area of a current image is performed by the correlation calculator 170, utilizing a particular correlation function (ST 118). There are several correlation functions, such as NCCF (Normalized Cross Correlation Function), MSE (Mean Square Error) and MAE (Mean Absolute Error). These correlation functions can be represented by the following equations.

$$NCCF(p, q) = [\Sigma I_n(i, j) * I_{n+1}(i+p, j+q)] / [I_n^2(i, j)^{1/2} * (\Sigma I_{n+1}^2(i+p, j+q))^{1/2}]$$

$$MSE(p, q) = E[\{(I_n(i, j) - I_{n+1}(i+p, j+q)\}^2]$$

$$MAE(p, q) = E[|I_n(i, j) - I_{n+1}(i+p, j+q)|] \quad (3)$$

Here, E() represents a mean value, and (p, q) represents coordinates of the checking area that has the highest correlation with the correlation area located at (0, 0).

Figure 6:
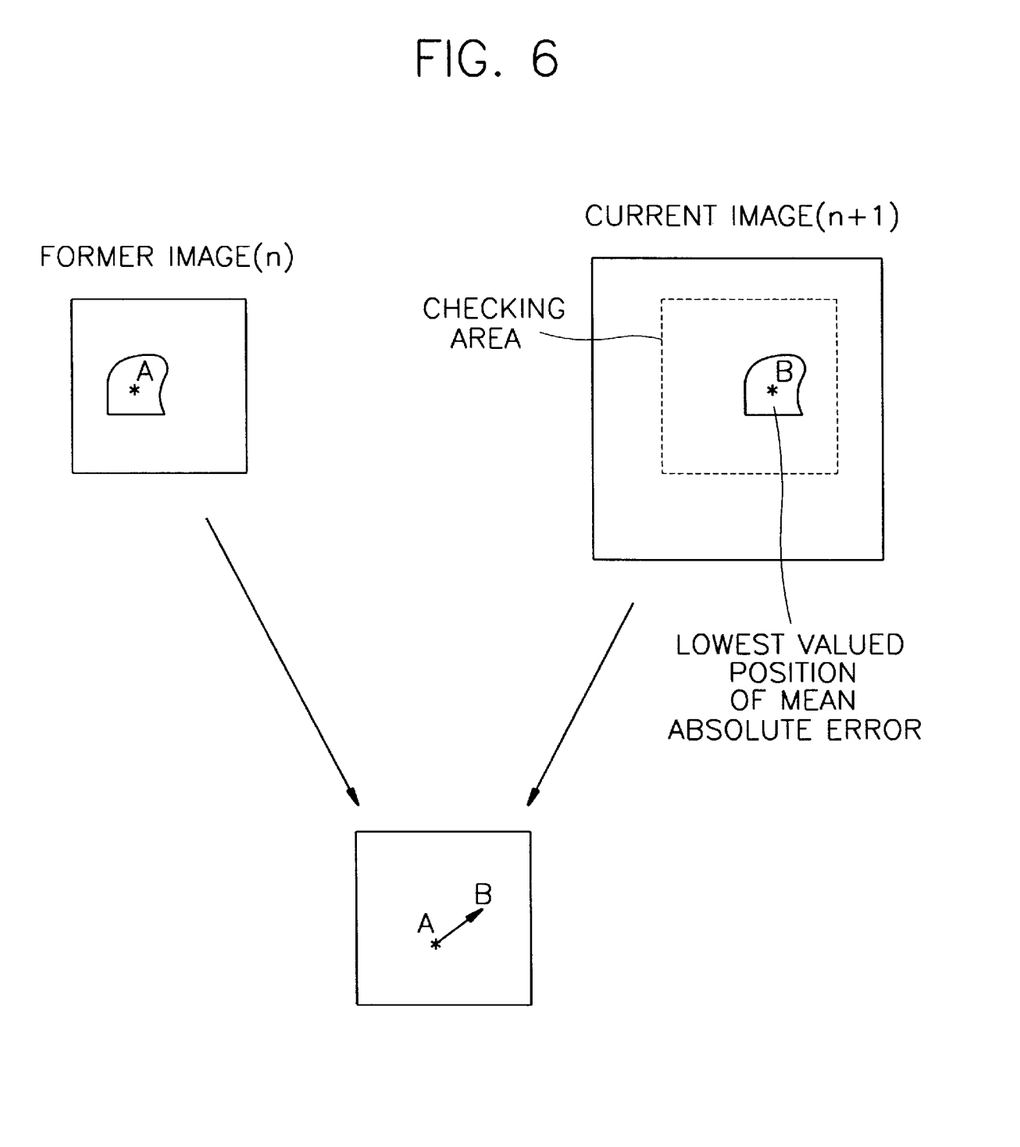
FIG. 6 is a view to illustrate a step for calculating a correlation shown in FIG. 1.

The NCCF is proper enough to adapt, but considering the quantity of data to process, we used the MAE in this embodiment. The higher the correlation between images is, the smaller the value of the MAE. As shown in FIG. 6, the correlation between the correlation area of the former image including the initial image and the checking area of the current image is calculated, and thereby a portion whose correlation is highest, that is the MAE is lowest, is interpreted as a target.

Movement is estimated by the movement estimator 180 by calculating the difference between the location of the correlation area of the former image and the location of the highest correlation portion in the checking area (ST 120). The estimated movement of the target is transferred to the controller 150, and the controller 150 controls the motor driver 114 utilizing the information of the movement so that the gazing point of a camera can follow the target. The motor driver 114 operates the motor 112, and the motor 112 generates a power to move the camera 104 so that the camera 104 can gaze on the moving target (ST 122).

Throughout those steps, one cycle of target tracking process, that is from the input of the image signal of the moving target to moving of the camera 104 into a location into which the target moved, is accomplished.

After this, the newly output image signal from the picture-taking section 100 is provided to the A/D converter 122 as described above, and at this time the controller 150 turns on the A/D converter 122, the first memory 132 and the third memory 136, and then turns off the A/D converter 122, the first memory 132 and the third memory 136 until the movement estimator 180 estimates the movement so that the output signal of the picture-taking section 100 cannot be input into the A/D converter 122 and the memories 132 and 136.

These processes for the image signal successively produced are kept on until the communication is terminated (ST 124, ST 126). That is, whether a new image is supplied from the picture-taking section 100 is checked, and if a new image is input, the steps from ST 114 to ST 122 are performed. If not, the tracking function is terminated. In addition, new image is not provided even though communication is kept on, the process waits until the new image is provided.

In FIGS. 8 to 12, a method and an apparatus for target tracking, according to the second embodiment of the present invention are shown. In the second embodiment, 'quad-tree division and merge' is used in order to extract a shape of a correlation area for target tracking, which is different from the first embodiment.

Figure 8:
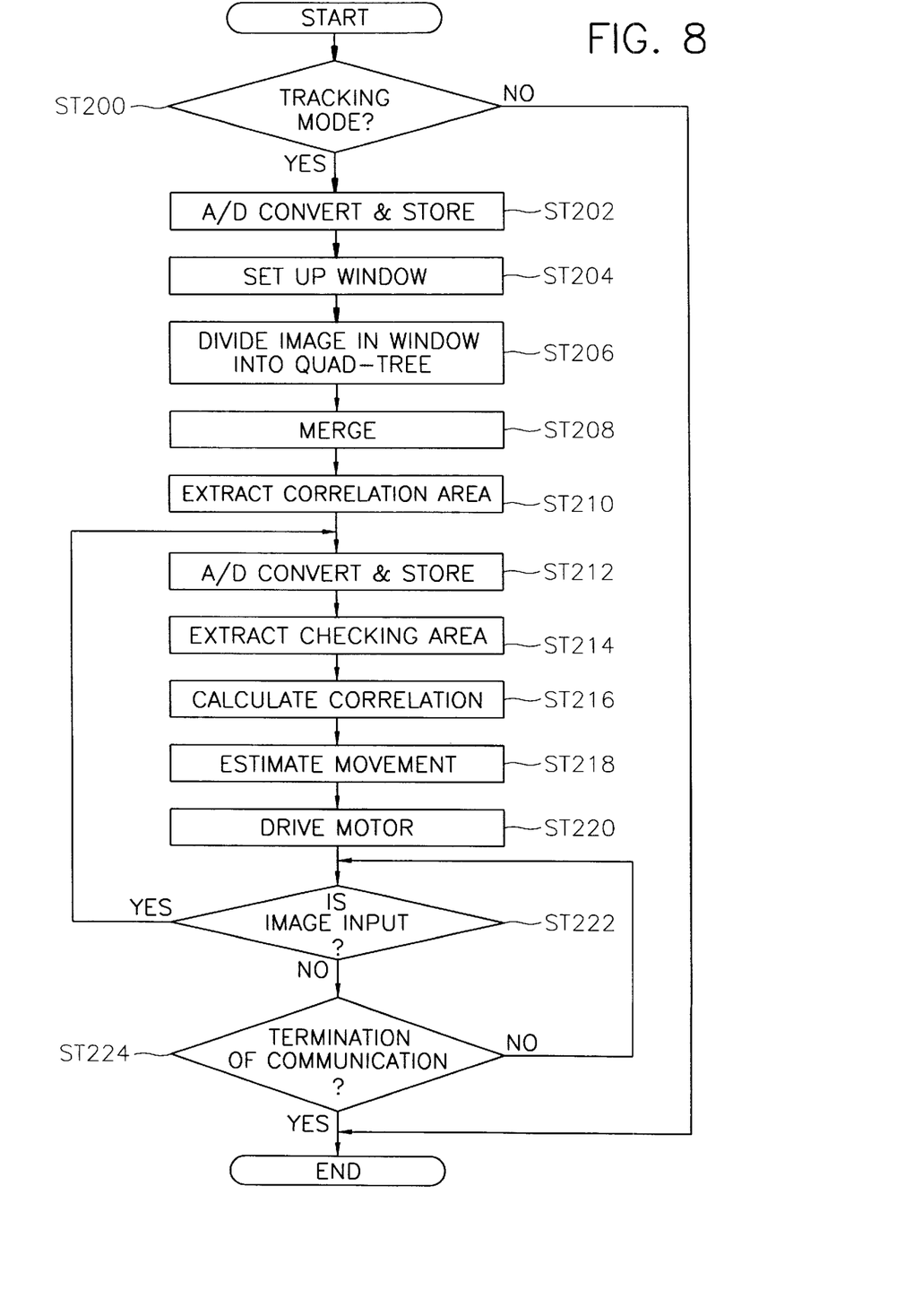
FIG. 8 is a flow chart of a second embodiment of a target tracking control method in a video phone, according to the present invention.

The target tracking method according the second embodiment comprises: a step for determining a correlation area by quad-tree dividing and merging a window which includes the target within a former image to which the initial image belongs, based on the luminosity of the pixels; a step for extracting a checking area from a current image for correlation check; a step for calculating a correlation between the correlation area and the checking area; and a step for driving a motor to move a camera by estimating the movement of the target based on the correlation calculated.

Figure 12:
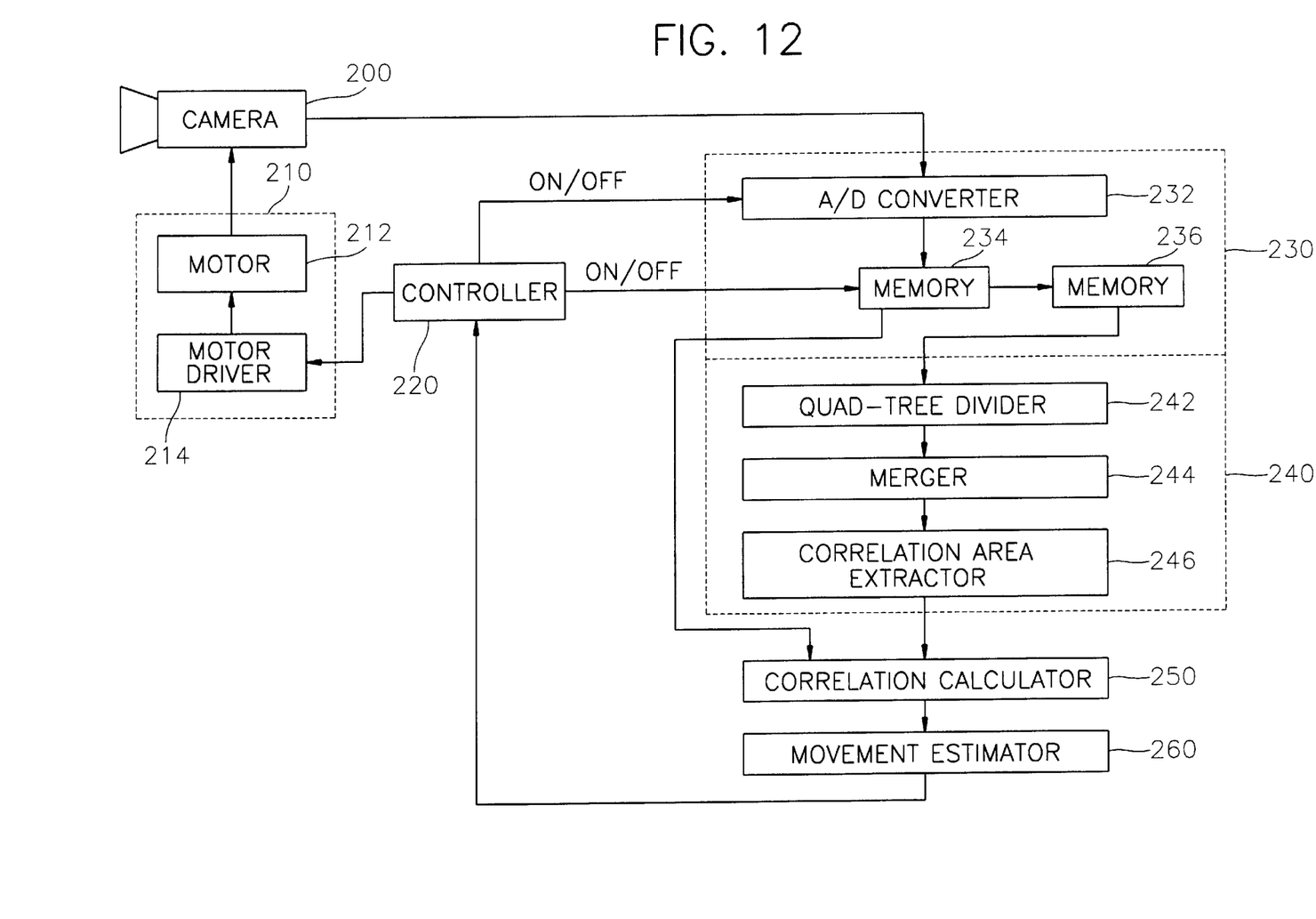
FIG. 12 is a block diagram of a second embodiment of a target tracking control apparatus in a video phone, according to the present invention.

An apparatus for performing the target tracking method is illustrated in FIG. 12. This apparatus comprises a picture-taking section 200, a motor part 210, a controller 220, an image storing section 230, a correlation area determining section 240, a correlation calculator 250, and a movement estimator 260.

The image storing section 230 stores an image signal from the picture-taking section 200 in a tracking mode, comprising an A/D converter 232 for converting the image signal into a digital signal when the image signal is an analog signal, a first memory 234 for storing the current image signal from the A/D converter 232, and a second memory 236 for storing the image signal from the first memory 234. Of course, if the output signal from the picture-taking section 200 is a digital signal, the A/D converter 232 can be omitted.

The correlation area determining section 240 sets up an initial window containing the target within a former image stored in the image storing section 230, quad-tree divides the window, and merges divided window based on the luminosity of the pixels to determine a correlation area. The correlation area determining section 240 comprises a quad-tree divider 242 for setting up the initial window within a former image stored in the second memory 236, and for quad-tree dividing the window by a homogeneity measuring function based on a luminosity of each pixel, a merger 244 for merging the divided rectangles including rectangles corresponding to the target and those neighborhood rectangles based on the degree of dispersion, and a correlation area extractor 246 for extracting the merged rectangles as the correlation area.

The correlation calculator 250 extracts the checking area from the current image provided from the image storing section 230 based on the correlation area, and calculates the correlation between these two areas. Here, the checking area contains an area of the current image corresponding to the correlation area in the former image and to 8 pixels which are 4-directionally added around the correlation area, and the correlation function is also the MAE function.

The movement estimator 260 estimates the movement from the calculated correlation.

The controller 220 controls the operation of the image storing section 230 and generates a control signal to make the camera 200 track the target according to the movement of the target estimated by the movement estimator 260.

The motor part 210 includes a motor driver 214 for driving a motor 212 according to the control of the controller 220, and a motor 212 for moving the camera 200 according to the driving signal from the motor driver 214.

Hereinafter, an explanation for the operation of the target tracking apparatus of the second embodiment according to the present invention will be provided together with the explanation for the target tracking method.

If a communication is initiated in a tracking mode, the A/D converter 232 is turned on by the controller 220, and the output signal, such as an NTSC signal, from the camera 200 is converted into a predetermined bit of digital signal, for example 8 bit, by the A/D converter 232. The converted signal is stored in the first memory 234.

The initial image stored in the first memory 234 is shifted into the second memory 236 to be supplied into the quad-tree divider 242. Utilizing the initial image, the quad-tree divider 242 sets up a predetermined size of initial window, such as 8 pixel by 8 pixel, so that the window can include a face of the target, such as a speaker (ST 204).

Figure 9:
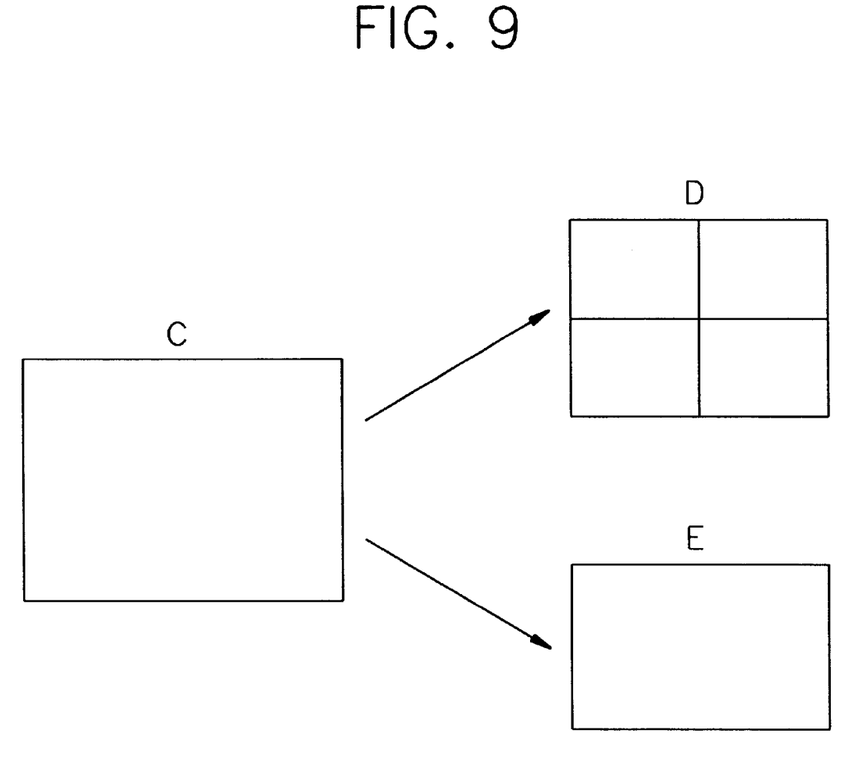
FIG. 9 is a view to illustrate a step for quad-tree dividing shown in FIG. 8.

After setting up the initial window, the quad-tree divider 242 divides the initial window into a quad-tree, as shown in FIG. 9, with a homogeneity measuring function based on the luminosity of each pixel (ST 206). The homogeneity measuring function is as the following equation (4), yielding a degree of dispersion.

$$U=(1/N)\Sigma\Sigma|I(x, y)-M|  \qquad (4)$$

Here, N represents the number of pixels in the window, M represents a mean luminosity of pixels in the window, and I(x, y) represents a luminosity of each pixel.

In the above equation, the state that the dispersion value U is small section that luminosity of each pixel in the window has little difference from the mean, which section that the dispersion of luminosity is homogeneous. Thus, as shown in FIG. 9, the dispersion value U about target window (C) is calculated by the equation (4). If the dispersion value U is larger than a predetermined threshold, then the window (C) is quad-tree divided into 4 windows like (D). However, if not, then we can interpret that the luminosity of pixels within the window (C) is homogeneous, so there is no need to divide the window (C) like (E). Repeat this quad-tree dividing process for each of the quad-tree divided rectangles.

Figure 10:
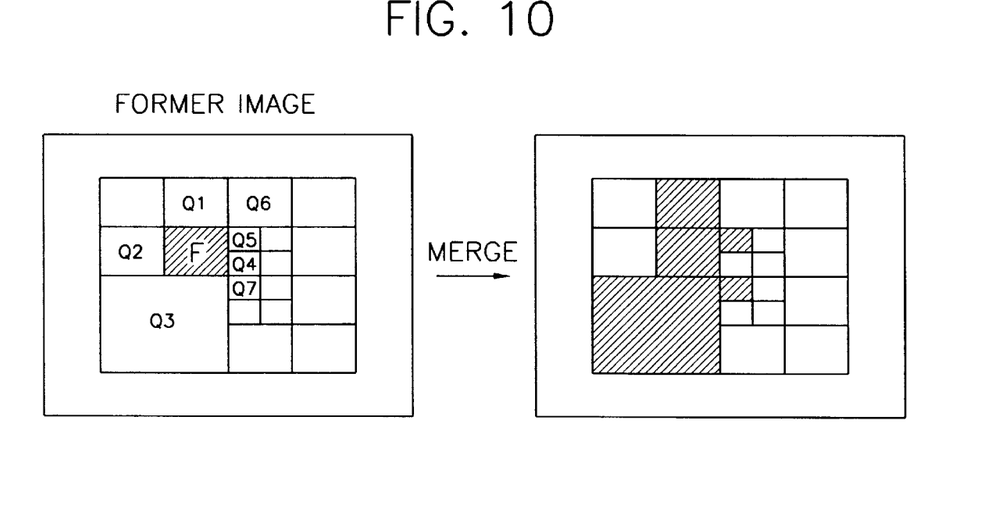
FIG. 10 is a view to illustrate a step for merging shown in FIG. 8.

After performing the quad-tree dividing step (ST 206), the merging step (ST 208) is performed of the quad-tree divided rectangles within which the target is included and the neighborhood rectangles thereof based on the dispersion degree. That is, supposing that the window is quad-tree divided as shown in FIG. 10 and the target is currently located at rectangle 'F', then there are 7 rectangles, such as (Q1, Q2, . . . , Q7), that are located around the rectangle 'F' as a center, so merging is performed about the rectangle 'F' and the neighboring 7 rectangles.

For merging, the equation (4) is used, and if the dispersion value U is smaller than a predetermined threshold, then two rectangles involved is merged. For example, as shown in FIG. 10, the dispersion value U from the rectangle F in which a speaker, or a target, is positioned and from its neighboring rectangles (Q1, Q2, . . . , Q7), respectively, are calculated and if the dispersion value U of the rectangle F and 4 rectangles such as (Q1, Q3, Q5, Q7) is below the threshold, then the rectangle F and the 4 rectangles are merged.

Figure 11:
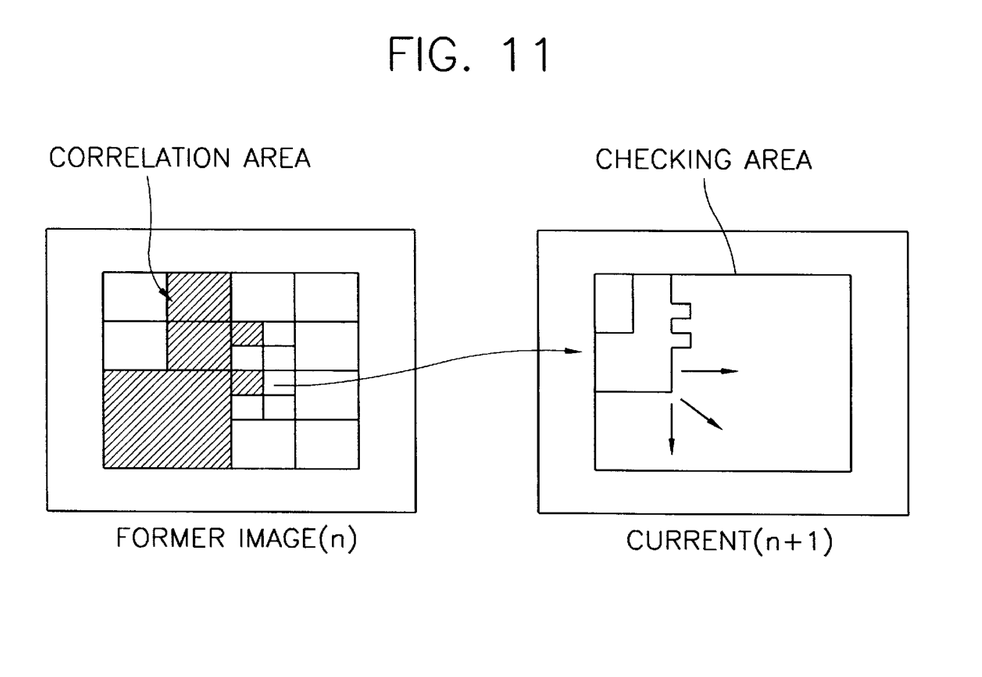
FIG. 11 is a view to illustrate a step for calculating a correlation shown in FIG. 8.

After merging as above, the extracted correlation area 246 determines the merged area, such as the rectangles (F, Q1, Q3, Q5, Q7), shown as deviant areas in FIG. 11, as a correlation area (ST 210).

After determining the correlation area, a checking area from a current image is extracted to check the correlation (ST 214). If the current image input is an analog signal, the analog signal is converted into a digital signal and then stored in the first memory 234 (ST 212). Referring to the correlation area extracted from the former image, as shown in FIG. 11, an area, which is derived by adding 4 directional 8 pixels to an area in the current image corresponding to the correlation area is extracted, as the checking area.

On the other hand, the initial image stored in the second memory 236 becomes a former image, and the signal from the camera 200 is converted into a digital signal by the A/D converter 232 controlled by the controller 220 and is stored in the first memory 234 as a current image.

In order to calculate the correlation between the checking area of the current image and the correlation area of the former image, the window of the former image stored in the second memory 236 should be shifted to accord with the correlation area.

The successive steps, such as a step for calculating the correlation (ST 216), a step for estimating movement of the target (ST 218), a step for driving a motor (ST 220), and a step for repeating above steps from ST 212 to ST 220, are the same as those of the first embodiment. As such, it is possible for the camera 200 to track the moving target by moving the camera into a moved location of the target.

While the present invention has been particularly shown and described with reference to particular embodiments thereof, it is not limited only to the above specification and drawings. It will be understood by those skilled in the art that various changes in form and details may be effected therein without departing from the spirit and scope of the invention defined by the appended claims.

What is claimed is:

1. A method for tracking a target, comprising:
   i) finding a shape of the target from a former image including an initial image of the target, and extracting a predetermined size of an area including the shape of the target as a correlation area;
   ii) extracting a checking area in a current image by utilizing the correlation area to check a correlation, this step including the steps of:
      storing an image signal successively supplied while a current image and a former image which is supplied just before the current image are separately stored,
      extracting a portion of the current image which has a highest correlation with the former image as a shape of the correlation, and
      extracting the checking area in the current image which includes at least the correlation, on the basis of the correlation area;
   iii) calculating the correlation between the correlation area and the checking area by utilizing a correlation function;
   iv) estimating a movement of the target by calculating a change in location of the target based on the calculated correlation; and
   v) compensating the estimated movement during driving of a picture-taking means, thereby enabling a gazing point of the picture-taking means to track the target.

2. The method as claimed in the claim 1, wherein said step i) comprises the steps of:
   setting up an initial window containing the target within the former image;
   extracting a boundary pixel which represents a boundary of the target in the window;
   extracting the shape of the target by scanning the window to find the boundary pixel; and
   determining a correlation area's shape on the basis of the extracted shape of the target.

3. The method as claimed in the claim 2, said step i) further comprising the step of converting an input image signal that is an analog signal into a digital signal.

4. The method as claimed in the claim 2, wherein said boundary pixel is found by comparing an absolute value of horizontal and vertical differential values for a luminosity of each pixel in the window with a predetermined threshold.

5. The method as claimed in the claim 1, said method further comprising the step of selecting an input image signal which is used for tracking in a tracking mode.

6. The method as claimed in the claim 1, wherein said correlation function for checking the correlation is a mean absolute error function.

7. An apparatus for tracking a target, comprising:
   i) a picture-taking means for photographing a target to produce a successive image signal of the target, said picture-taking means comprising: a first camera for producing an infrared signal by photographing the target, a second camera for producing a NTSC signal by photographing the target, and a selecting means for selecting either the infrared signal or the NTSC signal to provide said storing means with a selected signal;

ii) a storing means receiving the image signal from the picture-taking means, for separately storing a current image and a former image which is supplied just before the current image;

iii) a correlation area determining means receiving the former image from said storing means, for extracting a shape of the target from the former image input, and extracting a predetermined size of area including the shape as a correlation area;

iv) a correlation calculating means for extracting a checking area in the current image provided from said storing means on the basis of the correlation area, and calculating a correlation between the correlation area and the checking area with a correlation function;

v) a movement estimating means for calculating a location change of the target to estimate movement of the target on the basis of the correlation calculated;

vi) a controlling means for controlling said storing means, receiving information of the movement estimated from said movement estimating means to produce a control signal by which a gazing point of said picture-taking means can track the target; and vii) a driving means receiving the control signal from said controlling means, for driving said picture-taking means.

8. The apparatus as claimed in the claim 7, wherein said storing means comprises:

a first memory for storing a signal of the current image; and a second memory for storing the signal output from said first memory as a signal of the former image, wherein an input/output operation of data in said first memory and said second memory is controlled by said controlling means.

9. The apparatus as claimed in the claim 8, wherein said storing means further comprises a signal converting means for converting an analog image signal from said picture-taking means into a digital signal, and providing the converted signal to said first memory, and said signal converting means is controlled by said controlling means.

10. The apparatus as claimed in the claim 7, wherein said storing means comprises a signal converting means for converting an analog image signal from said selecting means into a digital signal;

a first memory and a second memory for storing a converted signal from said signal converting means; and a third memory and a fourth memory for storing a signal from said first memory and said second memory, respectively, and a signal stored in said first memory and said third memory is produced by said first camera, and a signal stored in said second memory and said fourth memory is produced by said second camera.

11. The apparatus as claimed in the claim 7, wherein said correlation area determining means comprises:

a boundary pixel extractor for setting up a predetermined size of a window including the target from the former image provided by said storing means and extracting a boundary pixel from the window;

a target extractor for extracting a shape of the target by horizontally and vertically scanning the window to find the boundary pixel; and a shape determinant for determining a shape of the correlation area including the shape of the target, based on the shape of the target.

12. The apparatus as claimed in the claim 11, wherein said boundary pixel is found by comparing an absolute value of a horizontal and a vertical differential values for luminosity of each pixel with a predetermined threshold to find a boundary.

13. The apparatus as claimed in the claim 7, wherein the correlation function for calculating the correlation is a mean absolute error function.

* * * * *